(No Model.)

A. A. GRAHAM.
RAILWAY CATTLE GUARD.

No. 595,471. Patented Dec. 14, 1897.

WITNESSES:
H. Walker
C. R. Ferguson

INVENTOR
A. A. Graham
BY
ATTORNEYS.

UNITED STATES PATENT OFFICE.

ALBERT ALEXANDER GRAHAM, OF TOPEKA, KANSAS.

RAILWAY CATTLE-GUARD.

SPECIFICATION forming part of Letters Patent No. 595,471, dated December 14, 1897.

Application filed February 3, 1897. Serial No. 621,842. (No model.)

*To all whom it may concern:*

Be it known that I, ALBERT ALEXANDER GRAHAM, of Topeka, in the county of Shawnee and State of Kansas, have invented new and useful Improvements in Railway Cattle-Guards, of which the following is a full, clear, and exact description.

This invention relates particularly to metallic guards for railway-tracks for the purpose of better excluding cattle or other animals from railway-inclosures than has heretofore been possible by the guards of ordinary construction.

The invention comprises pivoted jaws or blades, each consisting of a vertical portion and a portion extended at an inward and upward angle therefrom at the lower edge, the said jaws or blades being extended longitudinally of the track-rails.

The invention further consists in the construction and combination of the several parts, as will be hereinafter fully described and then pointed out in the appended claims.

Reference is to be had to the accompanying drawings, forming a part of this specification, in which similar characters of reference indicate corresponding parts in all the views.

Figure 1:
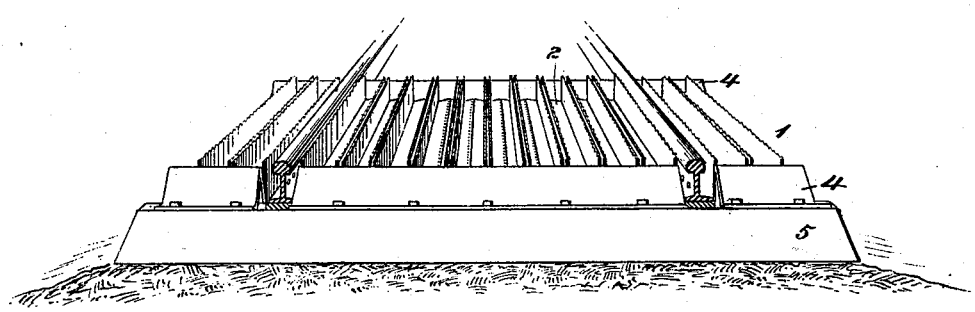
Figure 2:
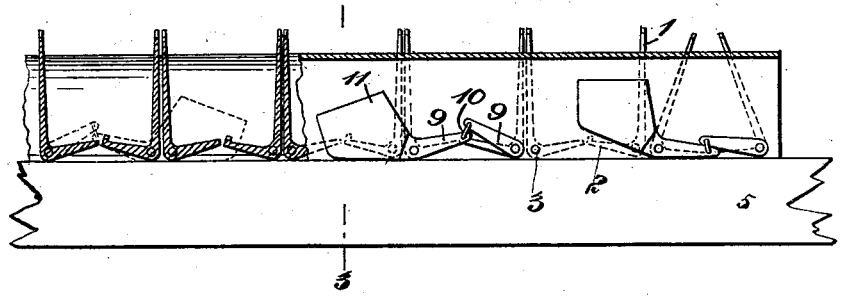
Figure 3:
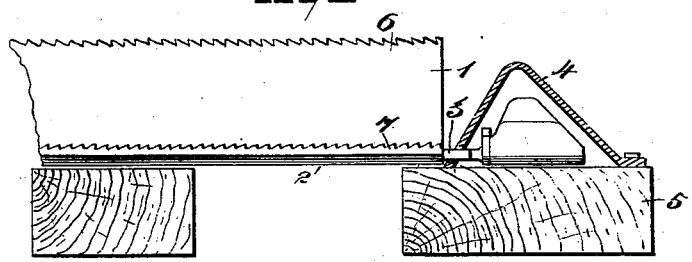
Figure 4:

Figure 1 is a perspective view of a guard embodying my invention. Fig. 2 is a partial section and partial elevation thereof, drawn on an enlarged scale. Fig. 3 is a partial elevation and a section on the line 3 3 of Fig. 2, and Fig. 4 is a plan view of one of the jaws or blades.

The invention comprises jaws or blades consisting of vertically-disposed portions 1 and bottom portions 2, extended at an inward and upward angle to the portions 1, so that should an animal step on said bottom portions the upper edge of the vertically-disposed portions will be swung inward. At the junction of the portions 1 and 2 the jaws or blades are provided with trunnions 3, which have bearings in the inner side walls of housings 4, attached at their base to string-pieces 5. The opposite walls of these housings are inclined downward and outward, so that they will not form any great obstruction to dragging chains, rods, brake-beams, or similar devices on a train.

The vertically-disposed portions 1 are provided on the upper edge with saw-teeth 6, and the portions 2 at their edges have upwardly-turned short saw-teeth 7, the teeth 7 being extended in a direction opposite that of the teeth 6. These teeth 7 are designed to prevent the slipping of an animal's hoof, which, if allowed, might cause injury to the animal's leg from the teeth 6. As a further means to prevent the slipping of an animal's hoof the upper surface of the portion 2 may be corrugated or roughened, as shown at 8 in Fig. 4.

The several series of jaws are linked together in pairs, the jaws of a pair having the lower portions 2 extended toward each other, and the vertically-disposed portions of the jaws of one pair engaging normally against the vertically-disposed portion of the jaws of other pairs.

Within the housings 4 arms 9 are secured to the trunnions 3, the ends of the arms 9 of a pair of jaws being connected together by a link 10. As here shown, the arm 9 of one jaw of a pair slightly overlaps the end of the arm 9 of the other jaw of said pair, and one of these arms 9 at the opposite side of its pivotal point is provided with a counterbalancing-weight 11, which normally holds the portions 1 of the jaw in their vertical position. It is obvious, however, that other counterbalancing devices—such, for instance, as springs—may be employed without departing from the spirit of my invention.

As shown in Fig. 1, the jaws are arranged between the rails of a track, and jaws are also arranged at the outer sides thereof. The teeth on the vertically-disposed portions must be long and sharp enough to take sufficient hold, so that it will require considerable force upon the part of an animal to make a step against them, but not long enough to take such a hold as would pin an animal to the spot or would catch on any dragging chain, rod, brake-beam, or the like. The teeth should be pointed very slightly in the direction from which the guard is intended to prevent the passage of animals, and the row of teeth on the bottom portions of the jaws should be a trifle less in size and, as before stated, point in the opposite direction from the teeth on the vertical portions. By this arrangement of the teeth no permanent injury to the animal will be inflicted. As the cords of the leg are on the front and back part of the leg the sawing and wounding at the side may be somewhat painful, but not necessarily injurious.

In operation it is quite obvious should an animal attempt to cross the guard that upon stepping on the lower portions of the jaws the vertically-disposed portions of the jaws will be swung inward and engage with the animal's leg, and, as before stated, the teeth and roughened surfaces of the lower portions of the jaws will have a tendency to prevent the slipping of the animal's hoof, particularly small animals, such as sheep and hogs. The moving of the jaw of itself will oftentimes be sufficient to stop cattle, as it is a very familiar action for cattle when they step on a stick, a piece of board, or the like and see it move ahead of them to turn aside.

In the construction of the guard ordinary flat steel tie-plates are placed on top of the ties under the rails to keep the rails from cutting into the ties. The space in which the jaws or blades have to work is from the top of the tie to the top of the rail or slightly above it, so that the placing of these plates on the top of the ties under the rails will increase the vertical space by the thickness of the plates, which permits the jaws to be made wider than would be the case were the plates omitted.

The advantages of the guard embodying my invention may be summed up as follows: It has no projecting points on which dragging chains, rods, brake-beams, and the like may catch and tear up the guard. It will give pain to the animal trying to pass without doing permanent injury. It will not catch and hold or pinion cattle. It is a guard against live stock of all sizes and kinds. It does not break the continuity of the track by a pit. It is simple in its construction, and being controlled by gravity-weights it cannot get out of order.

Having thus described my invention, I claim as new and desire to secure by Letters Patent—

1. A railway cattle-guard, comprising pairs of movable jaws extended parallel with the track-rails, each jaw consisting of a substantially vertical portion and a base at an inner and upward angle to the vertical portion and counterbalances for moving and sustaining said jaws in their normal position, substantially as specified.

2. A railway cattle-guard, comprising pairs of pivoted jaws, each jaw consisting of a substantially vertical portion and a base portion at an inward and upward angle to the vertical portion, the jaws of a pair having link connection, and a counterbalance for each pair of jaws, substantially as specified.

3. A cattle-guard, comprising a series of pivoted jaws, each jaw consisting of a vertically-disposed portion and a portion extended at an inward and upright angle from the lower edge of the vertically-disposed portion, the top edges of the vertically-disposed portions being serrated or toothed, serrations or teeth on the lower portion, and counterbalance-weights for operating and supporting the jaws in their normal position, substantially as specified.

4. A cattle-guard, comprising a series of jaws arranged in pairs, each jaw being substantially L shape in cross-section, trunnions on the jaws, housings having inclined walls, the said trunnions having bearings in the inner side walls of said housings, arms extended from the trunnions within the housings, the arms of a pair of jaws being linked together, and a counterbalance-weight on the arm of one jaw of a pair, substantially as specified.

5. A cattle-guard, comprising pairs of jaws connected together to swing, one pair independent of another pair, and a counterbalance for each pair, substantially as specified.

ALBERT ALEXANDER GRAHAM.

Witnesses:
JAMES R. WICK,
C. G. TITUS.